United States Patent [19]

Calvert

[11] 4,189,967

[45] Feb. 26, 1980

[54] SLITTER ROLLERS

[75] Inventor: Edward G. Calvert, Flaxbourton, England

[73] Assignee: Masson Scott Thrissell Engineering, Ltd., Great Britain

[21] Appl. No.: 861,242

[22] Filed: Dec. 16, 1977

[30] Foreign Application Priority Data

Dec. 30, 1976 [GB] United Kingdom ............... 54350/76

[51] Int. Cl.[2] ........................ B23D 35/00; B23D 19/04

[52] U.S. Cl. ........................................ 83/665; 83/675; 83/700; 403/5

[58] Field of Search .................. 83/665, 698, 700, 675, 83/504, 508.2, 508.3; 93/58.2 R; 403/5

[56] References Cited

U.S. PATENT DOCUMENTS

| | | | |
|---|---|---|---|
| 2,801,694 | 8/1957 | Schneider et al. | 83/675 |
| 3,073,198 | 1/1963 | Clem | 83/665 X |
| 3,153,967 | 10/1964 | Williams et al. | 83/675 |
| 3,173,325 | 3/1965 | Warren et al. | 83/665 X |
| 3,422,714 | 1/1969 | Van Gompel et al. | 83/504 X |
| 3,742,714 | 7/1973 | Thomas | 83/665 X |
| 3,951,024 | 4/1976 | Weiskopf | 83/665 X |

*Primary Examiner*—J. M. Meister

*Attorney, Agent, or Firm*—Seidel, Gonda, Goldhammer & Panitch

[57] ABSTRACT

Rings formed as slitter knives or counter-members are secured against axial displacement from selected positions along a slitter roller by inflating a number of pneumatic tubes carried in recesses formed in the circumferential surface of the roller, the recesses running lengthwise of the roller and being all located on one side of a plane containing the rotational axis of the roller. A flat is formed on the roller at a position diametrically opposite the pneumatic tubes to provide more positive location of the rings. Air is supplied to the tubes via a hollow shaft fitted to one end of the roller, the tubes being in pairs each formed from a tube of U-shape, the legs being disposed in adjacent recesses one end being connected to the hollow shaft and the other closed. Balancing of the roller is obtained by the use of different length set screws to which different numbers of washers are fitted, and also weights may be fitted to the inside of the roller.

5 Claims, 4 Drawing Figures

SLITTER ROLLERS

This invention relates to slitter rollersfor paper-converting machines; a slitter for a paper web serves to cut the web longitudinally into two or more narrower webs and normally comprises a pair of co-operating rollers placed across the path of the web on opposite sides of said path, one roller carrying one or more annular knives and the other roller carrying a corresponding number of annular counter-members, aligned with the respective knives. The knives and counter-members are required to be movable axially of their respective rollers, i.e. across the width of the web being slit, and secured at any selected position so that the two or more narrower webs produced are of desired widths.

It is common in the paper trade for any particular web width to be required in relatively small quantities, so that it is desirable that the movement of slitter knives and counter-members from one position to another should be possible with speed and accuracy, as while this adjustment is being effected either the web feed is stopped or the web being delivered has to be rejected as its width is not constant, output in either case being reduced. A main factor in obtaining such speedy and accurate movement of the knives and counter-members is the means of securing the knives and counter-members in their selected positions. It is already known to provide a slitter roller with recesses in its circumferential surface and with pneumatic tubes disposed in such recesses so that when the tubes are inflated by compressed air they hold annular knives or counter-members placed on the roller against axial displacement, while deflation of the tubes permits the axial positions of the annular knives or counter-members to be altered.

It is an object of the present invention to provide an improved form of slitter roller, utilising inflatable tubes to hold annular knives or counter-members in desired axial positions thereon.

According to the invention, we provide a roller for supporting annular slitter members (i.e. knives or counter-members) and having pneumatic tubes in recesses of its circumferential surface for holding said members in desired axial positions thereon, in which said recesses and tubes extend lengthwise of the roller and are all located on one side of a plane containing the rotational axis of said roller.

In the known arrangements using such pneumatic tubes, the arrangement of the tubes is symmetrical about the rotational axis of the roller and hence, when the tubes are inflated and the slitter is in operation, the knives or counter-members are supported by the tubes only and driving torque is transmitted to the knives or counter-members entirely through the material of said tubes. With a roller embodying the present invention, inflation of the tubes urges the adjacent portions of the annular knives or counter-members away from the roller and hence urges a diametrically opposite portion of said knives or counter members into direct contact with the roller surface, providing a more positive location of said knives or counter-members and enabling direct transmission of driving torque thereto from said roller.

The arrangement of the tubes in a roller embodying the invention is clearly asymmetric and unbalanced. In view of the mass and operating speed of such a roller it is necessary to balance it and this may be done in conventional manner. The roller preferably is a composite structure, comprising a main body of tubular form and a pair of shafts attached to its ends, said shafts being supported in suitable journals. A plurality of set-screws may be provided in each end face of said roller, near the periphery thereof and extending parallel to the rotational axis of the roller, and some part of the necessary balancing of the roller may be effected by fitting different numbers of washers to said set-screws and by selection of the lengths of the set-screws, i.e. in some positions longer (and hence heavier) set-screws may be used than in other positions. At intermediate positions along the length of the roller, balance weights may be fitted inside the tubular main body, such weights conveniently being secured by counter-sunk set-screws inserted through the body to be received in tapped holes in the balance weights.

Air supply to the pneumatic tubes may be provided by having a hollow stub shaft at one end of the roller. At the free end of this stub shaft a rotary union may be disposed, allowing air to pass to and from the interior of the hollow shaft and hence to and from the pneumatic tubes in the recesses of the roller. Said tubes may conveniently be provided in pairs, each pair being formed of a length of tubing bent to an elongated U-shape, with the legs of the U disposed in adjacent recesses, one end of the tubing being connected to the interior of the hollow shaft and the other end being closed by a clamp holding it to one end face of the roller. The curved portion of tubing joining the legs of the U is held against the other end face of the roller, being pressed around a set-screw provided with a washer to urge the curved portion of tubing against said other end face. Preferably drive to the roller is applied via the stub shaft without the rotary union.

In order that the invention may be well understood a preferred embodiment thereof will now be described with reference to the accompanying drawing in which.

Figure 1:
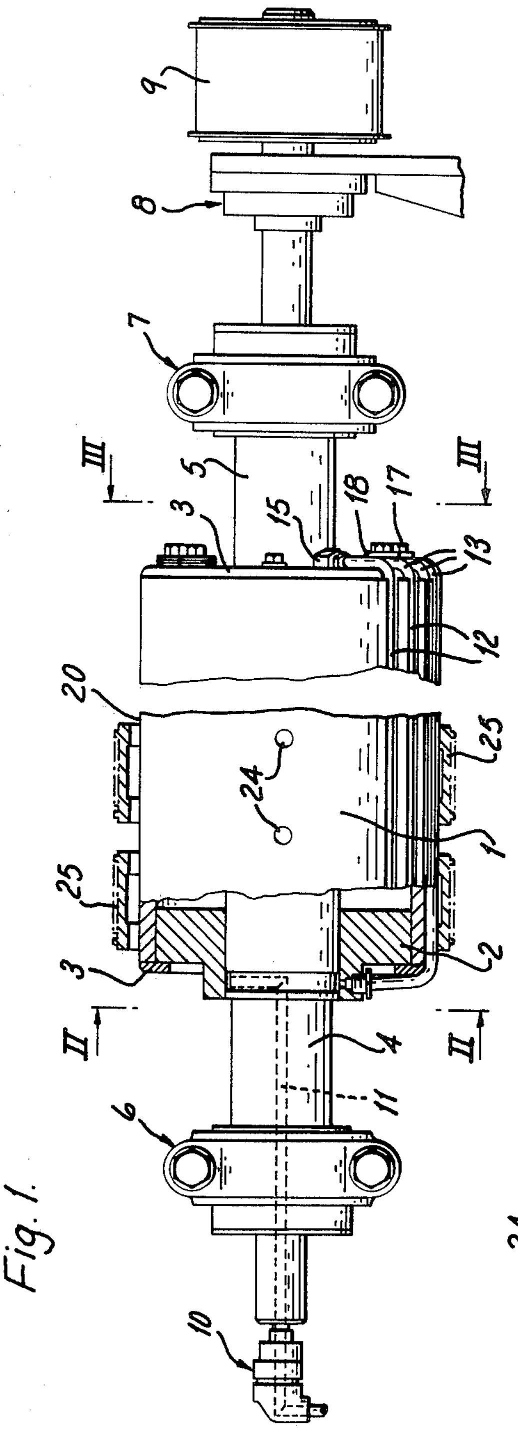
FIG. 1 shows, in elevation but with part broken away, a roller embodying the invention.

The roller shown in the drawings comprises a hollow tubular body 1 closed at its ends by inserted discs 2, and fitted with end rings 3. Stub shafts 4, 5 secured to the discs 2 and projecting from the ends of the body 1 are carried in respective bearing assemblies 6 and 7,8 which, although primarily journal bearings, can carry some axial thrust so as to provide axial location of the roller. The stub shaft 5 carries a drive pulley 9 and at the free end of the stub shaft 4 a rotary union 10 is fitted, said union enabling an external compressed air source and control valve (not shown) to be connected to a central bore 11 in the stub shaft 4.

Figure 3:
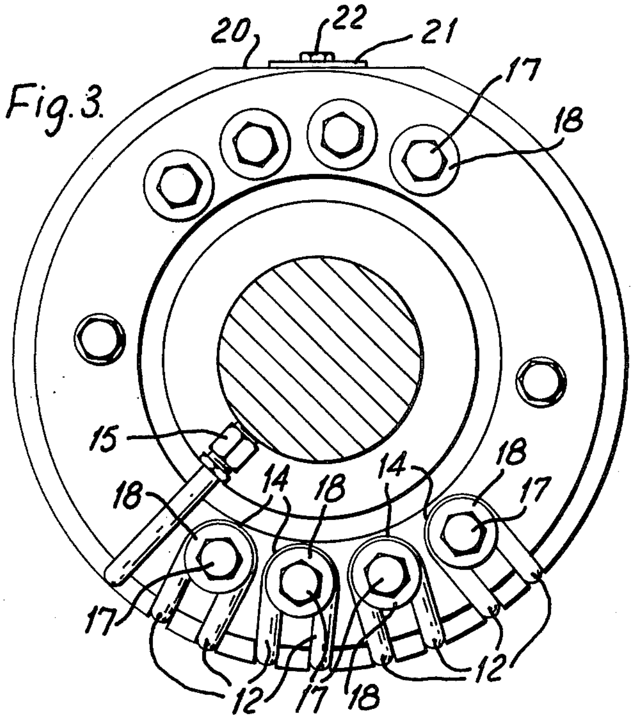

In the lower part of the body 1 nine pneumatic tubes 12 are accomodated in grooves extending parallelto the rotational axis of the roller. These tubes 12 are in fact formed by five lengths of tubing, four of which are arranged in elongated U-form to occupy two adjacent grooves. At the right-hand end of the roller, as seen in FIG. 1, the tubing from one groove is bent over through a right-angle bend 13 (FIG. 1) on to the end ring, and then formed into a U-bend 14 (FIG. 3) and a further right-angle bend 13 back into the next groove. There being an odd number of the tubes 12, there is one length of tubing which occupies only one groove and at the right-hand end of the roller this length is anchored to the shaft 5 by a union 15. At the left-hand end of the roller, all the lengths of tubing are connected by unions 16 to the shaft 4, said unions 16 providing connections for air-flow between the bore 11 in shaft 4 and the tubes 12. The bends 14 in the tubing, as will be seen from FIG. 3, are formed round respective set-screws 17, washers 18 being provided on said set-screws to hold said bends 14 of the tubing in place against the end face of the roller. The set-screws 17 also hold the rings 3 to the discs 2.

The four lengths of tubing which are arranged in elongated U-form each have one of the unions 16 at one end, and the other end of each of these lengths is held to the end face of the roller by a clamp 19 which serves also to close the end of the tubing against leakage of air.

Figure 4:
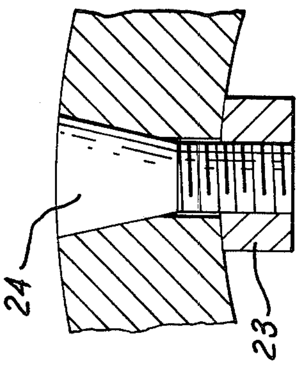
FIG. 4 is a detail section on line IV—IV of FIG. 1, drawn on a larger scale.
Figure 2:
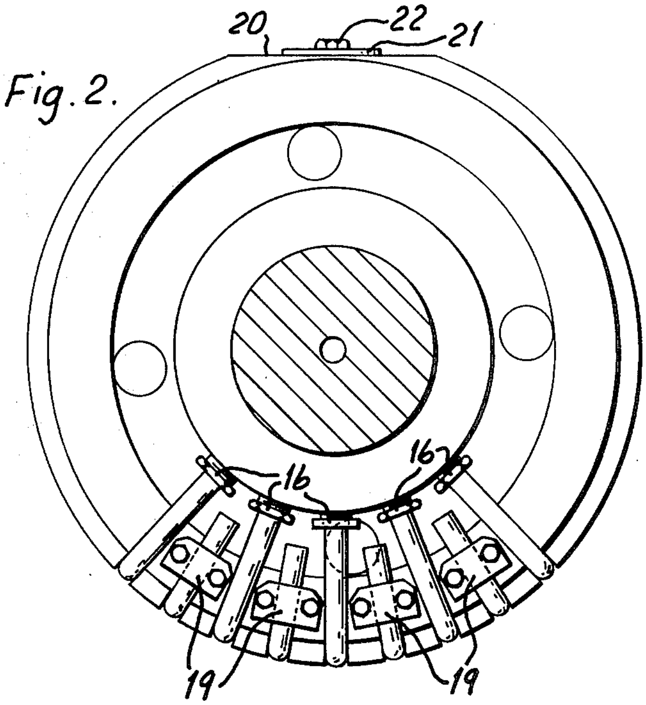
FIGS. 2 and 3 are sections, on lines II—II and III—III respectively of FIG. 1.

Diametrically opposite the region in which the grooves receiving tubes 12 are formed, the roller body 1 is formed with a flat 20—i.e. as viewed from the ends, a segment of the outer circle is omitted. The flat 20 is of such dimension as approximately to balance the roller with respect to the reduction of its mass due to the grooves. In the ends of the roller, in the vicinity of flat 20, further set-screws 17 with washers 18 are provided to secure the rings 3. In obtaining precise balancing of the complete roller, the set-screws 17 and washers 18 may be used as balance weights, i.e. on any one of said set-screws the number of washers may be varied, also set-screws of different lengths may beemployed (subject to whatever minimum length is needed with any particular size of roller to hold the rings 3 securely to the body 1). Furthermore, external balance weights 21 may be secured by set-screws 22 to the flat 20 (as indicated in dashed lines in FIG. 2 and 3) while around the curved surfaces of the body 1 internal balance weights 23 may be secured by counter sunk set-screws 24 (FIGS. 1 and 4). Conventional dynamic balancing methods may be used to determine the required positions and masses of such added weights and the specific requirements as to set-screws 17 and washers 18.

Any required number of knife rings or annular countermembers may be placed on the roller—two rings 25 are indicated in dashed lines in FIG. 1. When such rings are in desired positions, along the length of the roller, the application of compressed air via the rotary union 10, bore 11 and unions 16 to the interior of rubes 12 causes the latter to inflate and hold the rings against displacement axially of the body 1, by pressing against the inner surfaces of the rings 25, which pressure causes the edges of the flat 20, i.e. those edges which are parallel to the rotational axis of the body 1, also to engage the inner surfaces of the rings. This arrangement holds the rings more firmly than if the flat 20 was not provided. When however it is desired to move the rings to different positions it is only necessary to allow the air in tubes 12 to escape and the rings are free to be moved to new positions, whereafter re-inflation of tubes 12 again holds the rings in the new positions selected.

I claim:

1. A roller supporting annular slitter members and having pneumatic tubes in recesses formed in its circumferential surface for holding said members in desired axial positions thereon, in which said recesses and tubes extend lengthwise of the roller and are all located on one side of a plane containing the rotational axis of said roller, and a flat formed on the outer circumferential surface of the roller in a position diametrically opposite the region of said surface containing said grooves and pneumatic tubes.

2. A roller as claimed in claim 1 comprising a main body of tubular form and a pair of shafts being supported in journals, wherein one of said shafts is hollow and provided with a rotary union at its free end so that air may pass to and from the interior of said hollow shaft.

3. A roller as claimed in claim 2 in which said tubes are provided in pairs, each pair being formed of a length of tubing bent to an elongated U-shape with the legs of the U disposed in adjacent recesses, wherein one end of said tubing is connected to the interior of said hollow shaft, the other end is closed by a clamp holding it to one face of the roller, and the curved portion of tubing joining the legs of the U is held against the other end face of the roller.

4. A roller as claimed in claim 3 including balancing means for said roller in which said balancing means comprises a plurality of set screws provided in each end face of said roller near the periphery thereof and extending parallel to the rotational axis of said roller wherein said set screws are of selectable different lengths so as to receive different numbers of washers thereon.

5. A roller as claimed in claim 4 in which said balancing means further comprises balancing weights fitted inside said main body at intermediate positions along the length of said roller.

* * * * *